(12) United States Patent
Kubota et al.

(10) Patent No.: US 6,978,855 B2
(45) Date of Patent: Dec. 27, 2005

(54) FUEL CELL POWERED ELECTRIC VEHICLE

(75) Inventors: Shinya Kubota, Saitama (JP); Toshiyuki Matsuoka, Saitama (JP); Yoshinori Mita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/607,067

(22) Filed: Jun. 25, 2003

(65) Prior Publication Data
US 2004/0062955 A1 Apr. 1, 2004

(30) Foreign Application Priority Data
Jun. 25, 2002 (JP) ............................ P2002-184981

(51) Int. Cl.[7] ........................... B60K 1/00; B60K 11/00; B60R 16/04; H01M 8/04
(52) U.S. Cl. ................... 180/65.3; 180/65.1; 180/68.5; 180/68.2; 429/26
(58) Field of Search ............................. 180/65.1–65.8, 180/68.1, 68.5, 311, 312, 313

(56) References Cited

U.S. PATENT DOCUMENTS

| | | | | | |
|---|---|---|---|---|---|
| 4,081,693 A | * | 3/1978 | Stone | .......................... | 307/66 |
| 5,193,635 A | * | 3/1993 | Mizuno et al. | ............. | 180/65.3 |
| 5,332,630 A | * | 7/1994 | Hsu | ............................. | 429/20 |
| 5,490,572 A | * | 2/1996 | Tajiri et al. | ................. | 180/65.1 |
| 5,613,569 A | * | 3/1997 | Sugioka et al. | ............. | 180/68.5 |
| 5,641,031 A | * | 6/1997 | Riemer et al. | .............. | 180/65.3 |
| 6,220,383 B1 | * | 4/2001 | Muraki et al. | .............. | 180/68.5 |
| 6,302,228 B1 | * | 10/2001 | Cottereau et al. | .......... | 180/68.1 |
| 6,315,069 B1 | * | 11/2001 | Suba et al. | ................. | 180/68.5 |
| 6,360,835 B1 | * | 3/2002 | Skala | ......................... | 180/65.2 |
| 6,378,637 B1 | * | 4/2002 | Ono et al. | .................. | 180/65.3 |
| 6,443,253 B1 | * | 9/2002 | Whitehead et al. | ......... | 180/68.1 |
| 6,648,085 B2 | * | 11/2003 | Nagura et al. | .............. | 180/65.1 |
| 6,679,345 B2 | * | 1/2004 | Hirayama et al. | .......... | 180/65.3 |
| 2001/0052433 A1 | * | 12/2001 | Harris et al. | ................ | 180/68.5 |
| 2002/0162693 A1 | * | 11/2002 | Mizuno et al. | .............. | 180/65.1 |
| 2003/0027026 A1 | * | 2/2003 | Bruck et al. | ................... | 429/24 |
| 2003/0034186 A1 | * | 2/2003 | Morita et al. | ............... | 180/65.1 |
| 2004/0101725 A1 | * | 5/2004 | Kato et al. | ...................... | 429/24 |

FOREIGN PATENT DOCUMENTS

WO 96/41393 * 12/1996 .................. 429/20

* cited by examiner

*Primary Examiner*—Bryan Fischmann
*Assistant Examiner*—G B Klebe
(74) *Attorney, Agent, or Firm*—Lahive & Cockfield, LLP; Anthony A. Laurentano, Esq.

(57) ABSTRACT

In a fuel cell powered electric vehicle having a fuel cell system and an electricity storing device for storing electricity generated by the fuel cell system, the fuel cell system and the electricity storing device stored in a box are fixed to a lower side of a floor of a cabin. A plate is provided to separate the fuel cell system and the electricity storing device in the interior of the box from each other. In addition, through holes are provided in the floor of the cabin for connecting between a refrigerant inlet port and a refrigerant outlet port of the electricity storing device and the cabin.

10 Claims, 3 Drawing Sheets

FUEL CELL POWERED ELECTRIC VEHICLE

FIELD OF THE INVENTION

The present invention relates to a fuel cell powered electric vehicle having a fuel cell and an electricity storing apparatus for storing electricity generated by the fuel cell, and more particularly to the fuel cell powered electric vehicle having a structure in which a plate are interposed between the fuel cell and the electricity storing device.

DESCRIPTION OF THE RELATED ART

Conventionally, in fuel cell powered electric vehicles, a fuel cell stack which is controlled at a high temperature, is disposed at a front nose part or under a cabin. The electricity storing device for temporarily storing electricity generated by the fuel cells is disposed separately from the fuel cell stack at a different location such as a trunk at a rear part of the vehicle since the device is controlled at a low temperature.

FIG. 3 shows an arrangement of the fuel cell and the electricity storing device on a fuel cell powered electric vehicle (hereinafter, also referred to as a vehicle) in a related art. A fuel cell system 32 including a fuel cell stack 31 is stored at a front nose portion 35 of a vehicle 30. The fuel cell system is cooled by a cooling line. The fuel cell system 32 is constructed to store, in addition to the fuel cell stack 31, a humidifier, a heat exchanger and an electricity generation control circuit, which are not shown, in the same box. In addition, an electricity storing device 33 is stored in a trunk 36. The electricity storing device is cooled by a cooling line. As this occurs, the fuel cell stack 31 and the electricity storing device 33 are connected by high voltage wiring 34.

However, the cooling of the fuel cell and the electricity storing device according to their controlled temperatures can be facilitated using their own cooling lines. There is caused a problem that the volume, weight and costs of the whole system of the fuel cell system are increased, since the fuel cell and the electricity storing device are disposed away from each other at the different locations.

In addition, the high voltage wiring connecting between the fuel cell and the electricity storing device is forced to be long. Therefore, the layout of the wiring becomes complex. The electric power of the fuel cell system loss is increased.

SUMMARY OF THE INVENTION

It is an object of the invention to provide a fuel cell powered electric vehicle which can make the fuel cell and the electricity storing device for storing electricity generated by the fuel cell lighter in weight and smaller in size, the high voltage wiring shorter in length and the production costs lower. Further, the fuel cell powered electric vehicle can allow the fuel cell and the electricity storing device to be cooled effectively.

According to a first aspect of the invention, there is provided with a fuel cell powered electric vehicle, including:
a fuel cell controlled at a predetermined temperature;
an electricity storing device for storing electricity generated by the fuel cell; and
a box for storing the fuel cell and the electricity storing device disposed under a floor of a cabin, the box including a plate for separating the fuel cell from the electricity storing device, wherein
a through hole for connecting between the electricity storing device and the cabin is provided on the box, and wherein
the electricity storing device is cooled by air which has passed through the through hole.

According to the first aspect of the invention, the fuel cell and the electricity storing device can be disposed via a plate in the box under a cabin, whereby the weight, size and costs of the fuel cell and the electricity storing device can be made lighter, smaller and lower, respectively. Furthermore, the length of the high voltage wiring connecting between the fuel cell and the electricity storing device can be made shorter. The electric power loss can also be made smaller by disposing the fuel cell and the electricity storing device in the common box.

Furthermore, the electricity storing device controlled at relatively lower temperature than the fuel cell can be cooled by the air within the cabin. The fuel cell controlled at relatively higher temperature than the electricity storing device. The fuel cell is controlled at temperature, which is different from the electricity storing device. Therefore, the fuel cell can be cooled by a separate cooling line, whereby the fuel cell and the electricity storing device can effectively cooled to there own controlled temperatures.

In addition, the fuel cell and the electricity storing device can be protected against damage by external force by disposing them in the common box.

According to a second aspect of the invention, the fuel cell powered electric vehicle according to claim 1 further including a heat insulating material provided on the plate.

According to the second aspect of the invention, proper heat insulation can be provided between the fuel cell and the electricity storing device which have the different controlled temperatures, since the heat insulating material is included in the plate. The cooling efficiency can be improved to there by provide an effective cooling. In other words, even when the fuel cell and the electricity storing device are disposed close and adjacent to each other via the plate, since influence of heat generated by the fuel cell on the electricity storing device or vice versa is interrupted by the separation including the heating insulating material, temperature controls at different temperature bands can easily be implemented.

According to the third aspect of the invention, the electricity storing device has a refrigerant inlet port and a refrigerant outlet port so that the refrigerant inlet and outlet ports connect to the cabin via the trough hole.

According to the fourth aspect of the invention, the electricity storing device is controlled at a predetermined temperature.

According to the fifth aspect of the invention, the predetermined temperature of the electricity storing device is in a range of from about 40 to 50° C.

According to the sixth aspect of the invention, the fuel cell powered electric vehicle has a cooling device controlling the fuel cell at a predetermined temperature.

According to the seventh aspect of the invention, the predetermined temperature of the cooling device is from about 60° C. to 80° C.

DESCRIPTION OF THE PREFERRED EMBODIMENTS

Figure 1A:
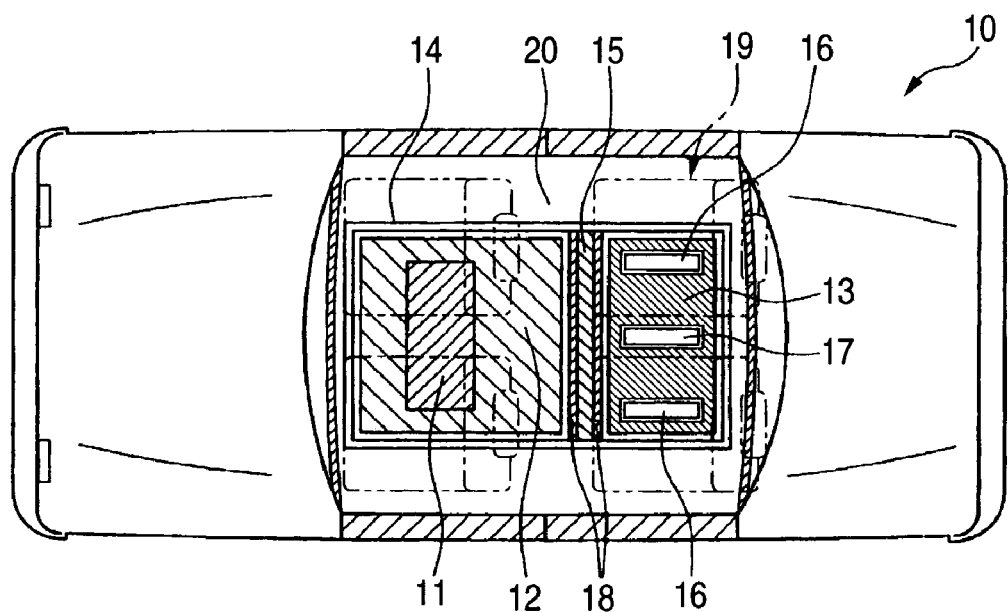
FIG. 1A is a plan view showing an arrangement of a fuel cell system and an electricity storing device according to an embodiment of the invention.
Figure 1B:
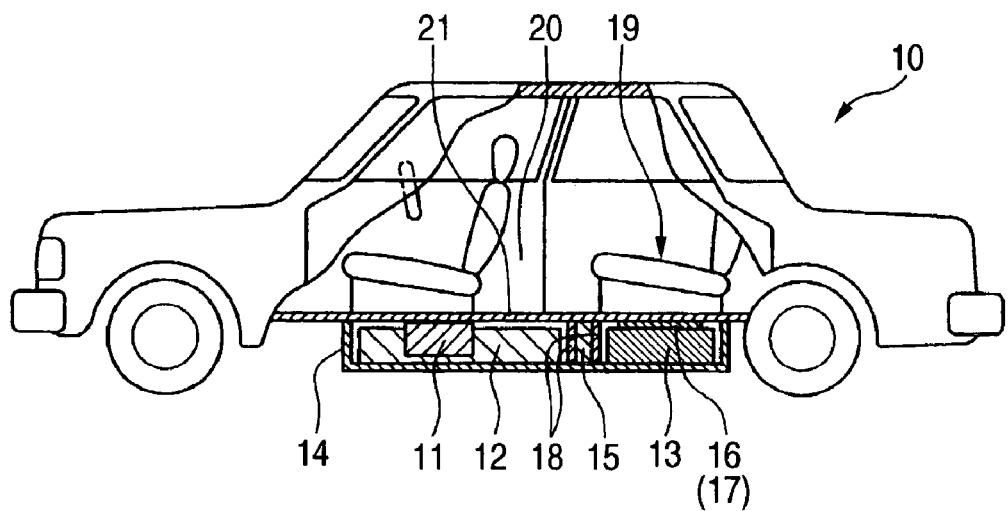
FIG. 1B is a partially sectional left side view according to an embodiment of the invention.

Referring to the accompanying drawings, an embodiment of a fuel cell powered electric vehicle according to the invention will be described. FIG. 1 shows an arrangement of a fuel cell system and an electricity storing device of a fuel cell powered electric vehicle according to an embodiment of the invention, in which FIG. 1A is a plan view and FIG. 1B is a left side view of the vehicle. As shown in FIG. 1, in a fuel cell powered electric vehicle 10 having a fuel cell system 12 including a fuel cell stack 11 constituted by a plurality of stacked flat plate-like fuel cells and an electricity storing device 13 for storing electricity generated by the fuel cell system 12, the fuel cell system 12 and the electricity storing device 13 are stored in a common box 14 and are disposed under a floor 21 of a cabin 20, and a plate 15 is provided to separate the fuel cell system 12 and the electricity storing device 13 stored in the interior of the box 14 from each other. Furthermore, heat insulating materials 18 are affixed to front and back of the plate 15.

This fuel cell system 12 generates electricity through electrochemical reaction between hydrogen and oxygen supplied from a hydrogen supply source including a high pressure tank, not shown, and an air supply source constituted by a compressor, respectively. Electricity so generated is then supplied to a driving motor, not shown, so as to drive the fuel cell powered electric vehicle.

In addition, the electricity storing device 13 is able to store part of electricity generated by the fuel cell. In particular, stores surplus generated output that is generated when the speed of the fuel cell powered electric vehicle is decreased. Furthermore, the electric power so stored is supplied to the driving motor when the fuel cell powered vehicle is accelerated so as to assist the fuel cell.

This electricity storing device 13 is disposed substantially directly below a rear seat 19 via the floor 21 of the cabin 20, a refrigerant inlet ports 16 and a refrigerant outlet port 17 are made to open to the interior of the cabin 20 via through holes, which will be described later on, so that air within the cabin 20 can be circulated as a refrigerant.

Figure 2:
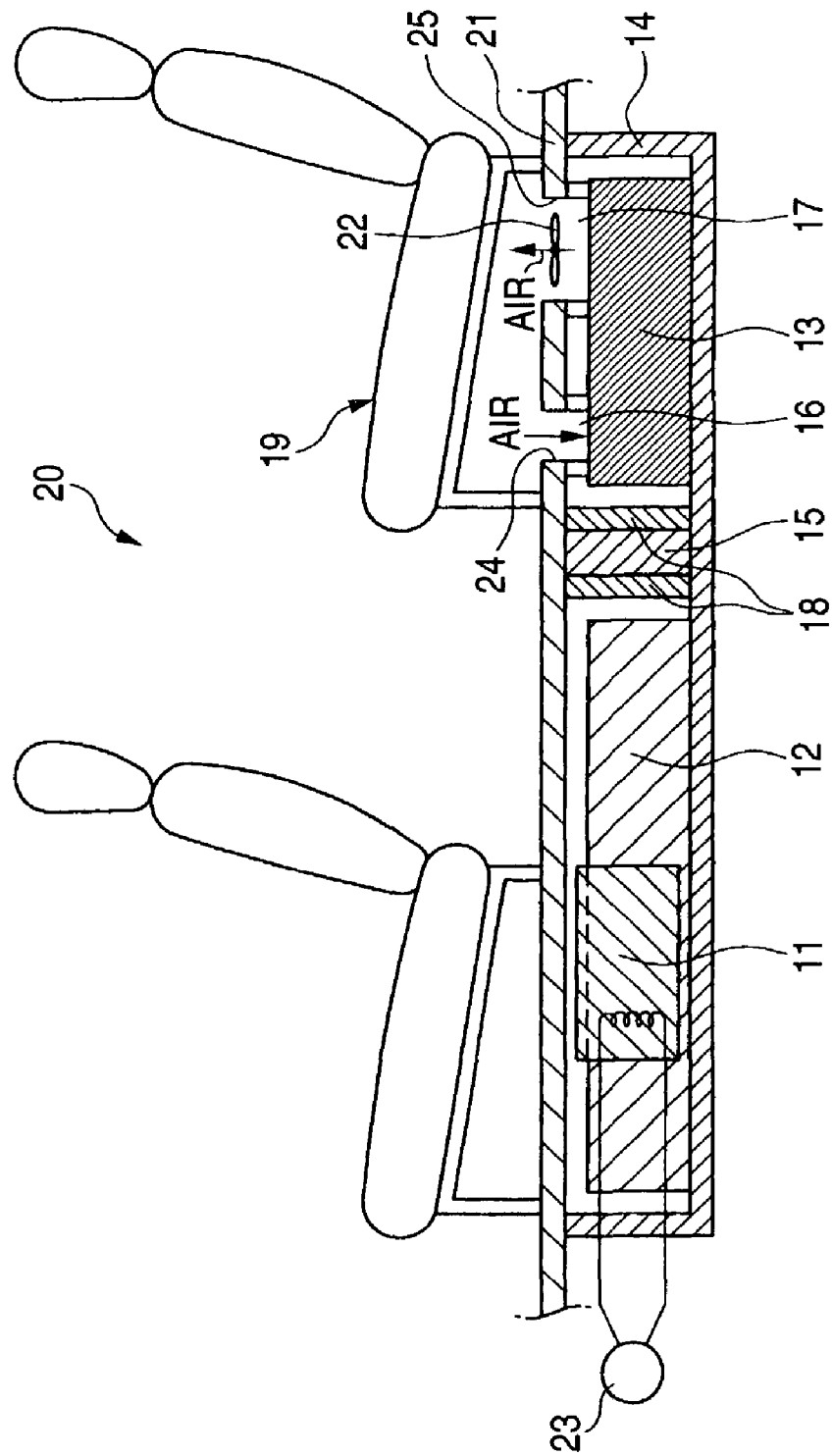
FIG. 2 is an enlarged sectional view showing the arrangement of the fuel cell system and the electricity storing device according to the embodiment of the invention.
Figure 3A:
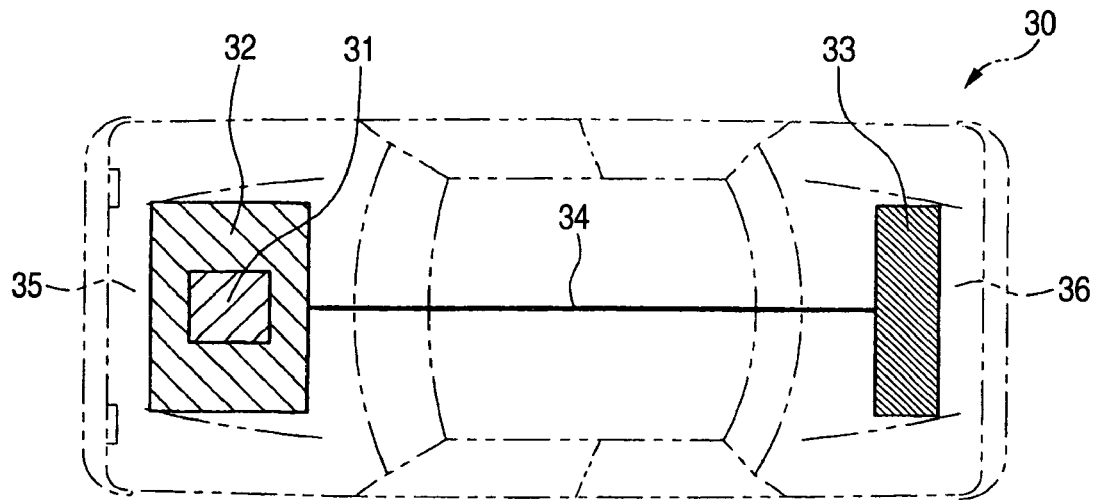
FIG. 3A is a plan view showing an arrangement of a fuel cell system and an electricity storing device according to a related art.
Figure 3B:
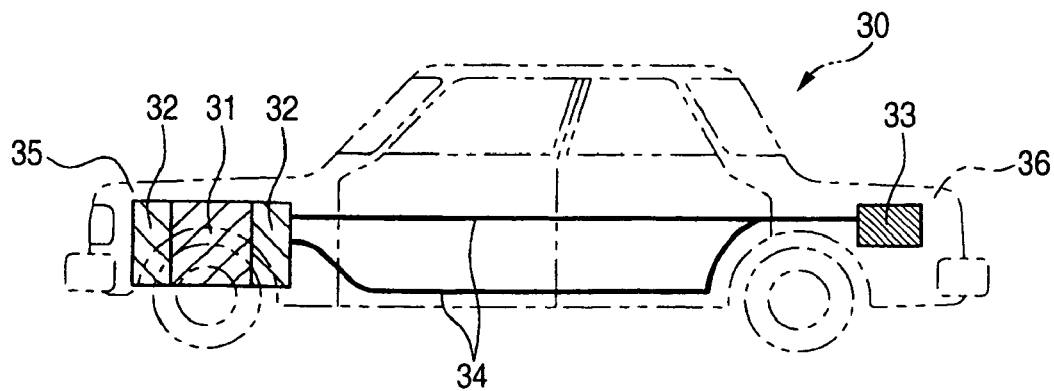
FIG. 3B is a left side view showing an arrangement of a fuel cell system and an electricity storing device according to a related art.

FIG. 2 is an enlarged sectional view showing the arrangement of the fuel cell system and the electricity storing device. In FIG. 2, the fuel cell system 12 and the electricity storing device 13 in the interior of the box 14 is separated by the plate 15, and the heat insulation materials 18 are provided on the plate 15. Accordingly, the fuel cell system 12 and the electricity storing device 13 to be heat separated from each other.

Since the fuel cell generates heat when electricity is generated through electrochemical reaction of hydrogen and oxidant, cooling water is circulated through the fuel cell system 12 by a cooling device such as a cooling pump 23, and the cooling water is allowed to be cooled by a cooling device such as a radiator, not shown, whereby the fuel cell system 12 is controlled to be cooled to the predetermined temperature.

The electricity storing device 13 includes, for example, an electric double layer capacitor or a secondary battery. The device 13 is enabling to storage part of electricity generated by the fuel cell. In addition, the device 13 generates heat through electrochemical reaction or electric resistance when electricity is charged and discharged. Due to this, through holes 24, 25 are provided in the floor 21 of the cabin 20 for the electricity storing device 13 so that communications are established between the refrigerant inlet ports 16 and the refrigerant outlet port 17 of the electricity storing device 13 and the cabin 20. Furthermore, a fan 22 is provided in the refrigerant outlet port 17 for discharging air within the electricity storing device 13 into the cabin 20. As this occurs, since the electricity storing device 13 has the refrigerant inlet ports 16, and the refrigerant outlet port 17, air within the electricity storing device 13 is discharged into the cabin 20 via the through hole 25, and air within the cabin 20 is drawn into the electricity storing device 13 via the through holes 24. In addition, the refrigerant inlet ports 16 and the refrigerant outlet port 17 are disposed at predetermined angles so that the air discharged into the cabin 20 via the through hole 25 does not enter the refrigerant inlet ports 16 directly from the refrigerant outlet port 17.

The air drawn in from the refrigerant inlet ports 16 as refrigerant cools the electricity storing device 13 and is then discharged into a space below the rear seat 19 in the cabin 20 through the through hole 25 formed in the floor 21 of the cabin 20.

Next, the function of the fuel cell powered electric vehicle is described heretofore will be described. As shown in FIG. 2, the fuel cell system 12 is allowed to have its own cooling device, since the fuel cell system 12 and the electricity storing device 13 stored in the interior of the box 14 are separated from each other by the plate 15. The fuel cell system 12 is controlled at a temperature ranging from about 60 to 80° C. by the cooling pump 23 and a pump control means, not shown.

In addition, the refrigerant outlet port 17 of the electricity storing device 13 is made to open toward the cabin 20. Air within the electricity storing device is discharged into the cabin 20 through the through hole 25 formed in the floor 21 of the cabin 20 by the fan 22 provided in the refrigerant outlet port 17 so opened. As this occurs, since the electricity storing device 13 has the refrigerant inlet ports 16 and the refrigerant outlet port 17, air within the electricity storing device 13 is discharged into the cabin 20 from the refrigerant outlet port 17 through the through hole 25. Air within the cabin 20 is drawn into the electricity storing device 13 from the through holes 24 via the refrigerant outlet ports 16. Accordingly, the electricity storing device 13 is controlled at a predetermined temperature which is lower than that of the fuel cell system 12. The predetermined temperature is in a range of from about 40 to 50° C.

Air thus discharged from the refrigerant outlet port 17 of the electricity storing device 13 is allowed to pass through the through hole 25 formed in the floor 21 of the cabin 20 to be discharged below the rear seat 19 in the cabin 20, so that it can circulate between the cabin 20 and the electricity storing device 13.

In addition, the fuel cell system 12 and the electricity storing device 13 are separated by the plate 15 inside the box 14, the interior of the box 14 being thus divided by the plate 15 into respective sealed structures. The heat insulating materials 18 are provided on the plate 15, so that the fuel cell system 12 and the electricity storing device 13 are heat insulated from each other, whereby the transfer of heat from the fuel cell system 12 having the relatively higher temperature than that of the electricity storing device 13 is made difficult. Accordingly, it is possible to prevent the increase in temperature of the electricity storing device 13.

In addition, since the fuel cell system 12 and the electricity storing device 13 are stored together in the box 14 via the plate 15, the length of the high voltage wiring (not shown) can be made short, whereby the electric power loss can be reduced.

Additionally, condition-controlled air within the cabin 20 can be utilized by putting the refrigerant inlet ports 16 and the refrigerant outlet port 17 of the electricity storing device 13 having the relatively lower controlled temperature through the floor 21 of the cabin 20 for communication with the cabin 20, thereby making it possible to cool the electricity storing device 13 effectively.

Furthermore, since the fuel cell system 12 and the electricity storing device 13 are installed under the floor of the cabin 20, the fuel cell system 12 and the electricity storing device 13 are prevented from being affected by direct sunlight, whereby the temperatures of the fuel cell system 12 and the electricity storing device 13 are made difficult to be increased even when the electric vehicle is left direct exposed to strong sunlight.

Thus, the condition-controlled air within the cabin 20 can be utilized by putting the refrigerant inlet ports 16 and the refrigerant outlet port 17 of the electricity storing device 13 having the relatively lower controlled temperature through the floor 21 of the cabin 20 for communication with the cabin 20, thereby making it possible to cool the electricity storing device 13 effectively.

In addition, since the plate 15 is provided to separate the fuel cell system 12 and the electricity storing device 13 in the interior of the box 14 from each other. The fuel cell system 12 and the electricity storing device 13 which have the different controlled temperatures can be cooled using the separate cooling lines. The fuel cell system 12 and the electricity storing device 13 can be united together to form a unitary body via the plate 15, whereby the service and maintenance of the system and the apparatus can be implemented effectively. Furthermore, by uniting the system and the apparatus together to form a unitary body, the rigidity of the box 14 can be increased, thereby making it possible to protect the fuel cell system 12 and the electricity storing device 13 against damage resulting from external force.

Additionally, since the through holes 24, 25 are formed below the rear seat 19 in the cab in 20, the space of the cabin 20 can be utilized effectively, and air discharged from the fan 22 is prevented from being applied direct to passengers.

The embodiment that has thus been described heretofore is only an example for explaining the invention and hence, the invention is not limited to the aforesaid embodiment and can be modified in various ways without departing from the spirit and scope thereof. For example, while the invention is has been described by reference to the embodiment in which the electricity storing device is cooled by discharging air as refrigerant into the passenger compartment using the fan, the fan may be disposed in the vicinity of the refrigerant inlet port so that air within the passenger compartment is drawn into the electricity storing device from the refrigerant inlet port for cooling the electricity storing device, and air as refrigerant may then be discharged into the passenger compartment.

In addition, an apparatus which makes use of an electric double layer capacitor working based on the electric double layer principle or a nickel-combined cell can be applied as the electricity storing device 13. Then, deteriorations in electrostatic capacity and life of the electricity storing device can be prevented by taking countermeasures against high temperatures as has been described heretofore.

ADVANTAGES OF THE INVENTION

As has been described heretofore, according to the first aspect of the invention, the fuel cell and the electricity storing device can be disposed together within the box under the floor of the passenger compartment by separating the fuel cell and the electricity storing device in the interior of the box from each other with the plate and hence allowing them to be cooled by the separate cooling lines, whereby the weight, size and costs of the fuel cell and the electricity storing device can be made lighter, smaller and lower, respectively. Furthermore, the length of the high voltage wiring between the fuel cell and the electricity storing device can be made shorter by disposing the cell and the apparatus together in the box. In addition, the deterioration in life of the electricity storing device can be prevented by controlling the temperature of the electricity storing device.

According to the second aspect of the invention, since the heat insulating materials are provided on the plate, the fuel cell and the electricity storing device which have the different controlled temperatures can be heat insulated from each other, whereby the cooling efficiency can be improved, and effective cooling can be provided.

What is claimed is:

1. A fuel cell powered electric vehicle, comprising:
    a fuel cell controlled at a predetermined temperature by a cooling device;
    an electricity storing device for storing electricity generated by the fuel cell,
    wherein the electricity storing device is controlled at a temperature which is different from the predetermined temperature of the fuel cell; and
    a common box for storing both the fuel cell and the electricity storing device disposed under a floor of a cabin, the common box including a plate for separating the fuel cell from the electricity storing device,
    wherein a through hole for connecting between the electricity storing device and the cabin is provided on the box, and
    wherein the electricity storing device is cooled by air which has passed through the through hole.

2. The fuel cell powered electric vehicle according to claim 1, further comprising:
    a heat insulating material provided on the plate,
    wherein the heat insulating material thermally insulates the fuel cell and the electricity storing device from each other.

3. The fuel cell powered electric vehicle according to claim 1,
    wherein the electricity storing device is controlled at the temperature which is in a range of from about 40 to 50° C.

4. The fuel cell powered electric vehicle according to claim 1,
    wherein the fuel cell is controlled at the temperature which is in a range of from about 60° C. to 80° C.

5. The fuel cell powered electric vehicle according to claim 1, wherein the cooling device is cooled by cooling water circulated through a radiator and the fuel cell.

6. The fuel cell powered electric vehicle according to claim 1, wherein the temperature of the electricity storing device is controlled to be lower than the predetermined temperature of the fuel cell.

7. The fuel cell powered electric vehicle according to claim 1,
wherein the electricity storing device has a refrigerant inlet port and a refrigerant outlet port so that one of the refrigerant inlet and outlet ports connects to the cabin via the through hole.

8. The fuel cell powered electric vehicle according to claim 7, wherein the refrigerant inlet and outlet ports are disposed on a lower side of a seat of the vehicle.

9. The fuel cell powered electric vehicle according to claim 7, wherein an air within a passenger compartment is utilized to be circulated so that an air after cooling the electricity storing device is discharged via another through hole into a passenger compartment.

10. The fuel cell powered electric vehicle according to claim 9, wherein the electricity storing device is disposed under a seat of the vehicle,
wherein the refrigerant inlet port and the refrigerant outlet port are disposed at a lower side of the seat of the vehicle.

* * * * *